United States Patent
Bisson et al.

(10) Patent No.: US 10,062,203 B2
(45) Date of Patent: Aug. 28, 2018

(54) VOXELIZATION OF MESH REPRESENTATIONS

(71) Applicant: AUTODESK, Inc., San Rafael, CA (US)

(72) Inventors: Martin Bisson, Montreal (CA); Olivier Dionne, Montreal (CA); Martin De Lasa, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 14/975,453

(22) Filed: Dec. 18, 2015

(65) Prior Publication Data

US 2017/0178388 A1  Jun. 22, 2017

(51) Int. Cl.
*G06T 15/00* (2011.01)
*G06T 17/00* (2006.01)

(52) U.S. Cl.
CPC .................. *G06T 17/00* (2013.01)

(58) Field of Classification Search
CPC ......... G07C 5/085; B60W 50/04; G06T 17/00
USPC ......................................................... 345/419
See application file for complete search history.

(56) References Cited

U.S. PATENT DOCUMENTS

| | | | |
|---|---|---|---|
| 8,989,851 B2 * | 3/2015 | Harley | A61B 5/0422 600/509 |
| 9,053,570 B1 * | 6/2015 | Mallet | G06T 17/05 |
| 9,147,239 B2 * | 9/2015 | Pau | G06T 7/00 |

OTHER PUBLICATIONS

Vieira, Miguel, and Kenji Shimada. "Surface mesh segmentation and smooth surface extraction through region growing." Computer aided geometric design 22.8 (2005): 771-792.*
Bächer, et al., "Spin-It: Optimizing Moment of Inertia for Spinnable Objects", in ACM Transactions on Graphics (TOG)—SIGGRAPH 2014, vol. 33, Issue 4, Article No. 96, Jul. 2014, 10 pages.
Baran, et al., "Automatic Rigging and Animation of 3D Characters", in ACM Transactions on Graphics (TOG)—SIGGRAPH 2007, vol. 26, Issue 3, Article No. 72, Jul. 2007, 8 pages.
Crassin, et al., "Octree-Based Sparse Voxelization Using the GPU Hardware Rasterizer", in OpenGL Insights, CRC Press, 2012, pp. 303-318.
Dionne, et al., "Geodesic Binding for Degenerate Character Geometry Using Sparse Voxelization" in IEEE Transactions on Visualization and Computer Graphics (TVCG), vol. 20, No. 10, Oct. 2014, 2 pages.

(Continued)

*Primary Examiner* — Phu K Nguyen
(74) *Attorney, Agent, or Firm* — Artegis Law Group, LLP

(57) ABSTRACT

One embodiment of the invention disclosed herein provides techniques for voxelizing a mesh representation associated with a three-dimensional model to generate a volumetric model. A model filling engine associated with a voxelization system identifies a first voxel included in a voxel grid array that intersects with the mesh representation. The model filling engine selects a second voxel at an exterior boundary of the voxel grid array that is not identified as a boundary voxel. The model filling engine marks the second voxel as an exterior voxel. The model filling engine marks all unmarked voxels that are adjacent to the second voxel as exterior voxels. The model filling engine marks all remaining voxels as interior voxels. A model finishing engine associated with the voxelization system generates a volumetric model based at least in part on the first voxel.

21 Claims, 11 Drawing Sheets

(56) References Cited

OTHER PUBLICATIONS

Jacobson, et al. "Robust Inside-Outside Segmentation using Generalized Winding Numbers" in ACM Transactions on Graphics (TOG)—SIGGRAPH 2013, vol. 32 Issue 4, Article No. 33, Jul. 2013, 12 pages.
Prévost, et al., "Make It Stand: Balancing Shapes for 3D Fabrication" in ACM Transactions on Graphics (TOG)—SIGGRAPH 2013, vol. 32, Issue 4, Article No. 81, Jul. 2013, 10 pages.
Schwarz, et al., "Fast parallel surface and solid voxelization on GPUs" in ACM SIGGRAPH Asia 2010 papers, vol. 29, Issue 6, Article No. 179, Dec. 2010, 9 pages.
Weyrich, et al., "Post-processing of scanned 3D surface data" in Proceedings of the First Eurographics conference on Point-Based Graphics (SPBG'04), Eurographics Association, Aire-la-Ville, Switzerland, pp. 85-94, 10 pages.
Wikipedia, "Winding Number" [Online], 6 pages. Available at http://en.wikipedia.org/wiki/Winding_number.

\* cited by examiner

VOXELIZATION OF MESH REPRESENTATIONS

BACKGROUND OF THE INVENTION

Field of the Invention

The present invention relates generally to three-dimensional (3D) computer graphics and, more specifically, to improved voxelization of mesh representations.

Description of the Related Art

In the domain computer graphics, 3D objects are often represented by surface mesh representations, where a surface mesh consists of a set of connected geometry primitives, such as triangles or quadrilaterals. Applications for such 3D objects include animated characters in computer games or films, models for fabrication via a manufacturing process, and objects for printing via a 3D printer. When generating 3D objects for such applications, the mesh representation is converted to a volumetric model via a process referred to as voxelization. With voxelization, the volume represented by the 3D mesh representation is filled with unit volumes referred to as volumetric elements or voxels. After the 3D mesh representation has been voxelized into a volumetric model, the volumetric model can be animated, as in the case of a model that represents a character in a computer game or film. Alternatively, the volumetric model can be transferred to a manufacturer for fabrication or to a 3D printer for printing.

One drawback to the above approach for creating volumetric models is that the mesh representations, which are typically created via many modeling and editing operations, can contain numerous imperfections. Examples of imperfect mesh representations include, without limitation, mesh representations that are non-watertight or non-manifold, mesh representations with self-intersections or interior geometry, and mesh representations composed of multiple parts. When a mesh representation containing one or more of these imperfections is voxelized, the resulting volumetric model can have several gaps and voids. Further, the resulting volumetric model may not unambiguously define which voxels reside on the exterior of the model and which voxels reside on the interior of the model. Consequently, further operations performed on the volumetric model may fail. For example, fabricating or printing a 3D model with one material on the interior and a different material on the exterior cannot be performed on a volumetric model that lacks clearly defined interior and exterior boundaries. Likewise, some processes for automatically rigging, or embedding a skeleton into, an animated character cannot be performed on a volumetric model that lacks clearly defined interior and exterior boundaries.

Currently, when problems with a volumetric model are identified, the end-user must manually fix those problems before any further processing operations can be performed on the volumetric model. Such manual techniques are both time consuming and tedious, resulting in increased costs and delays.

As the foregoing illustrates, what is needed are more effective ways to voxelize a mesh representation into a volumetric model.

SUMMARY OF THE INVENTION

Various embodiments of the present application set forth a method for voxelizing a mesh representation associated with a three-dimensional model to generate a volumetric model. The method includes identifying a first voxel included in a voxel grid array that intersect with the mesh representation. The method further includes selecting a second voxel at an exterior boundary of the voxel grid array that is not identified as a boundary voxel. The method further includes marking the second voxel as an exterior voxel. The method further includes marking all unmarked voxels that are adjacent to the second voxel as exterior voxels. The method further includes marking all remaining voxels as interior voxels. The method further includes generating a volumetric model based at least in part on the first voxel.

Various embodiments of the present application set forth a method for voxelizing a mesh representation associated with a three-dimensional model to generate a volumetric model. The method includes identifying all voxels included in a voxel grid array that intersect with the mesh representation. The method further includes selecting a starting voxel at an exterior boundary of the voxel grid array that is not identified as a boundary voxel. The method further includes marking the starting voxel as an exterior voxel. The method further includes recursively marking all unmarked voxels that are adjacent to the starting voxel as exterior voxels. The method further includes marking all remaining voxels as interior voxels. The method further includes generating a volumetric model based at least in part on the first voxels and the interior voxels.

Various further embodiments of the present application set forth a method for voxelizing a mesh representation associated with a three-dimensional model to generate a volumetric model. The method includes identifying a second set of voxels included in the voxel grid array, wherein each voxel in the second set of voxels has at least one voxel marked as an external voxel and is adjacent to at least one of a boundary voxel and or an interior voxel. The method further includes determining a subset of voxels included in the second set of voxels that reside inside a boundary associated with the volumetric model. The method further includes marking each voxel in the subset of voxels as a potentially internal voxel.

Various further embodiments of the present application set forth a method for voxelizing a mesh representation associated with a three-dimensional model to generate a volumetric model. The method includes, for each potentially internal voxel: determining whether the potentially internal voxel is adjacent to one or more voxels marked as external voxels; and if the potentially internal voxel is adjacent to one or more voxels marked as external voxels, then marking the potentially internal voxel as a final boundary voxel; or if the potentially internal voxel is not adjacent to one or more voxels marked as external voxels, then marking the potentially internal voxel as a final internal voxel.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that high quality volumetric models are created from imperfect mesh representation with little or no manual intervention. As a result, volumetric models may be prepared for animation, manufacturing, or 3D printing at lower cost and in less time relative to prior approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

Hardware Overview

Figure 1:
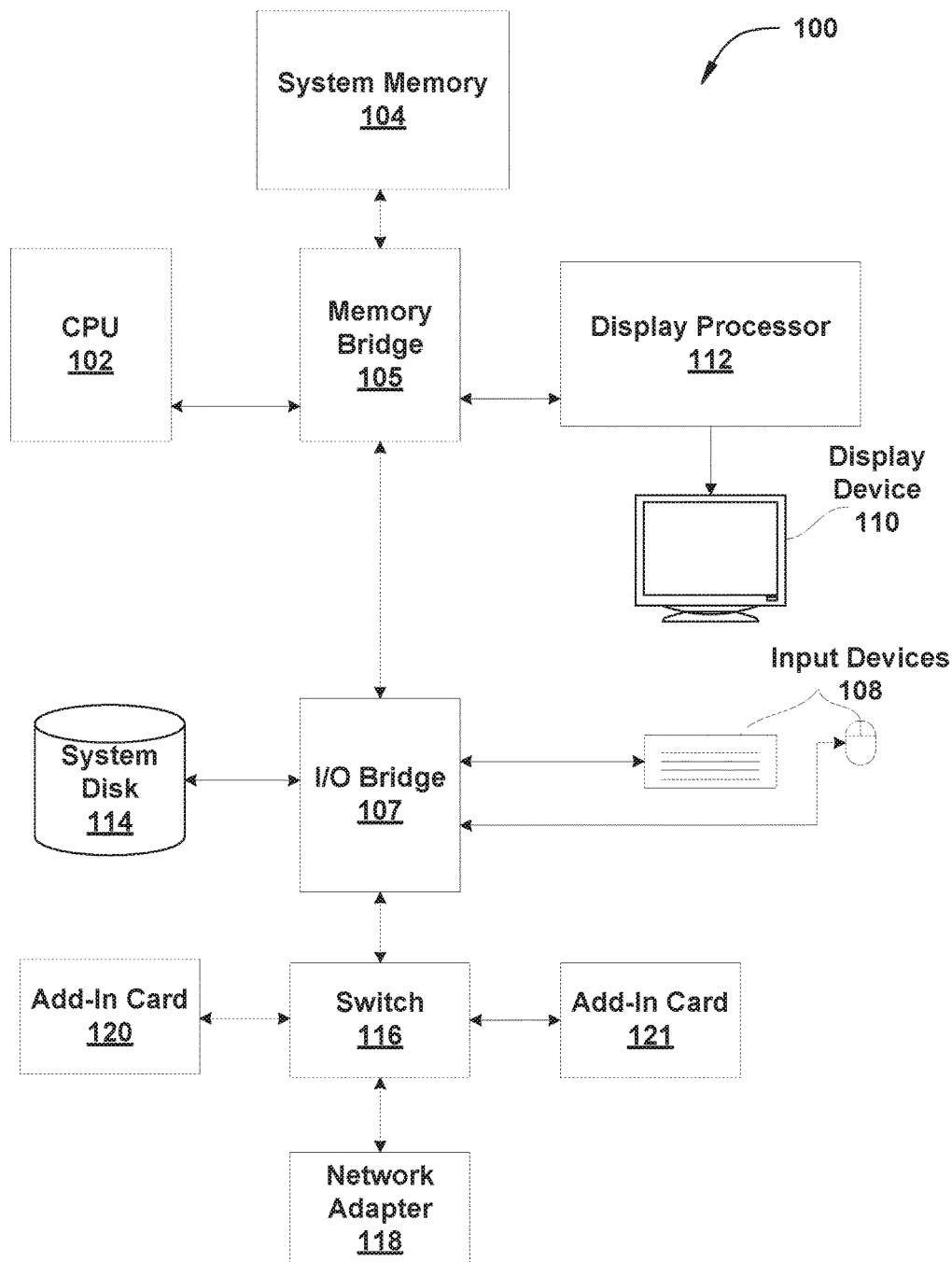
FIG. 1 illustrates a computing system configured to implement one or more aspects of the present invention.

FIG. 1 illustrates a computing system 100 configured to implement one or more aspects of the present invention. This figure in no way limits or is intended to limit the scope of the present invention. Computing system 100 may be a personal computer, video game console, personal digital assistant, mobile phone, mobile device, or any other device suitable for implementing one or more aspects of the present invention.

As shown, computing system 100 includes, without limitation, a processor 102, display processor 112, input/output (I/O) bridge 107, and system memory 104, coupled together and communicating via a bus path that may include a memory bridge 105. Processor 102 may be any technically feasible form of processing device configured to process data and execute program code. Processor 102 could be, for example, a central processing unit (CPU), a graphics processing unit (GPU), an application-specific integrated circuit (ASIC), a field-programmable gate array (FPGA), and so forth. Likewise, display processor 112 may be any technically feasible form of processing device configured to process data and execute program code. Display processor 112 could be, for example, a central processing unit (CPU), a graphics processing unit (GPU), an application-specific integrated circuit (ASIC), a field-programmable gate array (FPGA), and so forth.

Processor 102 and display processor 112 include one or more processing cores. In operation, one or both of processor 102 and display processor 112 is the master processor of computing system 100, controlling and coordinating operations of other system components. System memory 104 stores software applications and data for use by processor 102. Either or both of processor 102 and display processor 112 execute software applications stored within system memory 104 and optionally an operating system. In particular, either or both of processor 102 and display processor 112 executes software and then performs one or more of the functions and operations set forth in the present application. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to processor 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by processor 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computing system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by processor 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, processor 102, and I/O bridge 107 to form a system on chip (SoC). In still further embodiments, display processor 112 is omitted and software executed by processor 102 performs the functions of display processor 112.

Pixel data can be provided to display processor 112 directly from processor 102. In some embodiments of the present invention, instructions and/or data representing a scene are provided to a render farm or a set of server computers, each similar to computing system 100, via network adapter 118 or system disk 114. The render farm generates one or more rendered images of the scene using the provided instructions and/or data. These rendered images may be stored on computer-readable media in a digital format and optionally returned to computing system 100 for display. Similarly, stereo image pairs processed by display processor 112 may be output to other systems for display, stored in system disk 114, or stored on computer-readable media in a digital format.

Alternatively, processor 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

Processor 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to processor 102 directly rather than through a bridge, and other devices communicate with system memory 104 via memory bridge 105 and processor 102. In other alternative topologies display processor 112 is connected to I/O bridge 107 or directly to processor 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Improved Voxelization of Mesh Representations

Figure 2:
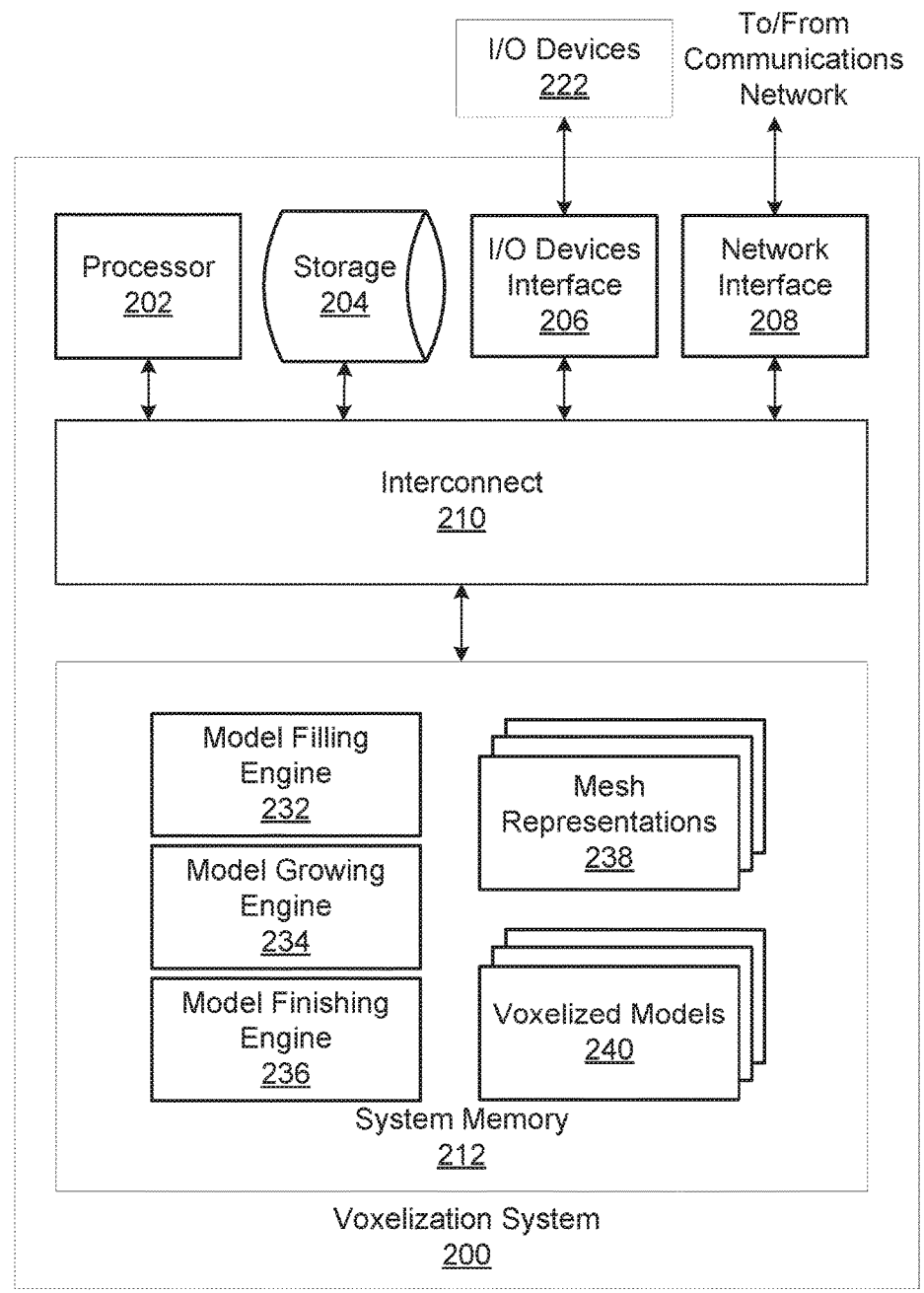
FIG. 2 is a block diagram of a voxelization system as implemented on the computer system of FIG. 1, according to various embodiments of the present invention.

FIG. 2 is a block diagram of a voxelization system 200 as implemented on the computing system 100 of FIG. 1, according to various embodiments of the present invention. In some embodiments, at least a portion of the voxelization system 200 may be implemented via the computing system 100 of FIG. 1. As shown, the voxelization system 200 includes, without limitation, a central processing unit (CPU) 202, storage 204, an input/output (I/O) devices interface 206, a network interface 208, an interconnect 210, and a system memory 212. The computing system 100 of FIG. 1 can be configured to implement the voxelization system 200. The processor 202, storage 204, I/O devices interface 206, network interface 208, interconnect 210, and system memory 212 function substantially the same as described in conjunction with FIG. 1 except as further described below.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further includes a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a model filling engine 232, a model growing engine 234, a model finishing engine 236, mesh representations 238, and voxelized models 240.

The model filling engine 232 retrieves a mesh representation 238 from system memory 212. The model filling engine 232 receives an orthographic domain consisting of a three-dimensional volume that fully surrounds the mesh representation 238. The model filling engine 232 further receives a desired volume resolution based on a width (w), height (h), and depth (d). The model filling engine 232 receives the orthographic domain and desired volume resolution via any technically feasible technique, including, without limitation, via user input, via default parameters stored in system memory 212, or as embedded values within the mesh representation 238. The model filling engine 232 generates a voxel grid array by dividing the orthographic domain into voxels, where each voxel has the size w×h×d. The model filling engine 232 then marks each voxel as an interior voxel, a boundary voxel, or an exterior voxel via the following technique.

The model filling engine 232 determines which voxels within the voxel grid array intersect with the mesh representation 238. All voxels that intersect with the mesh representation 238 are marked as boundary voxels. The model filling engine 232 then selects any non-boundary voxel that resides upon an edge or corner of the voxel grid array. That is, the model filling engine 232 selects any edge or corner voxel of the voxel grid array that has not been marked as a boundary voxel. The model filling engine 232 then flood fills the voxel grid array by starting at the selected voxel and recursively visiting each neighboring voxel until no further voxels are reachable. As used herein, neighboring voxels include voxels that are adjacent to a particular voxel. In some embodiments, neighboring voxels may include only those voxels that are orthogonally adjacent to a particular voxel in any one of the x direction, the y direction, or the z direction, but not diagonally adjacent. As each voxel is visited, if the voxel is not already marked as a boundary or exterior voxel, then the model filling engine 232 marks the visited voxel as an exterior voxel and continues recursion. After all reachable voxels have been visited, the model filling engine 232 ceases recursion and marks all remaining unmarked voxels as interior voxels.

In some embodiments, all voxels on the edges and corners of the voxel grid array may intersect with the mesh representation 238. In such embodiments, the model filling engine 232 may not mark any voxels as exterior voxels. The model filling engine 232 may then mark all non-boundary voxels as interior voxels.

If the mesh representation 238 does not include any voids or other imperfections, then the model filling engine 232 produces a correct volumetric model. If, however, the mesh representation 238 includes imperfections, then the flood filling operation may incorrectly mark interior voxels as exterior voxels, thereby generating a volumetric model with interior voids or gaps. To resolve such incorrectly marked voxels, the model filling engine 232 transmits the volumetric model to the model growing engine 234.

The model growing engine 234 receives a volumetric model from the model filling engine 232. The model growing engine 234 selects the set of exterior voxels that have at least one neighboring voxel that is a boundary voxel or an interior voxel. The voxels in this set of voxels is added to a list of voxels to test. For each of the voxels in the set of test voxels, the model growing engine 234 calculates the winding number for the test voxel, to determine whether each test voxel is inside or outside the volumetric model. In the domain of two-dimensional (2D) spaces, the winding number for a point or pixel in 2D space represents the total number of times that a curve travels counterclockwise (or clockwise) around the point or pixel. Generalizing the concept of winding numbers to the domain of 3D spaces, the winding number for a voxel in 3D space represents the total number of times that a surface travels around the voxel. More particularly, the winding number determines whether a particular test voxel is classified as being inside or outside of a surface that represents the boundary of the volumetric model.

Based on the calculated winding numbers, the model growing engine 234 determines which test voxels are inside the boundary of the volumetric model and which of the test voxels are outside the boundary. In some embodiments, the model growing engine 234 determines which test voxels are inside the boundary of the volumetric model and which of the test voxels are outside the boundary based on whether the winding number for each test voxel is above or below a given threshold. For example, if the winding number for a particular test voxel is less than 0.5, then the test voxel could be determined to be outside of the volumetric model. If the winding number for a particular test voxel is greater than or equal to 0.5, then the test voxel could be determined to be inside the volumetric model. The model growing engine 234 marks the test voxels that are inside the boundary as potentially interior voxels. The model growing engine 234 leaves unchanged the test voxels that are outside the boundary.

In some embodiments, the model growing engine 234 may repeat the above-described growing process of creating a voxel test list of the previous test voxels that were classified as interior voxels, determining the winding numbers, and marking voxels multiple times, updating the volumetric model each time the process is repeated. In such embodiments, the growing process is repeated consecutively until one or more completion criteria have been met, such as when no new voxels are found to add to the voxel test list or when a given number of iterations of the growing process is reached. In some embodiments, the filling process performed by the model filling engine 232 and the growing process performed by the model growing engine 234 may be alternated until no new voxels are found to add to the voxel test list. Alternating the filling process with the growing process may identify interior voxels more quickly, resulting in high quality volumetric models in less time relative to performing the growing process multiple times consecutively. In some embodiments, the model filling engine 232 may unmark all exterior voxels before performing an addition filling process. Once the completion termination criterion is reached, the model growing engine 234 transfers the volumetric model to the model finishing engine 236.

After one or more filling and growing processes, the model finishing engine 236 receives a volumetric model from the model growing engine 234. The model finishing engine 236 performs a finalization process to generate a smoothed final volumetric model. The model finishing engine 236 analyzes each voxel in the voxel grid array that is marked as an interior voxel, whether the voxel was marked during the mesh intersection process, the filling process or the growing process. The model finishing engine 236 classifies each of the interior voxels into one of two categories: (1) interior voxels that have no neighboring voxel marked as an exterior voxel; and (2) interior voxels that have at least one neighboring voxel marked as an exterior voxel. If an interior voxel has no neighboring voxel marked as an exterior voxel (classification 1), then the model finishing engine 236 marks the voxel as a final interior voxel. If, however, an interior voxel has at least one neighboring voxel marked as an exterior voxel (classification 2), then the model finishing engine 236 marks the voxel as a final boundary voxel. After classifying and finally marking each interior voxel, the model finishing engine 236 stores the finalized volumetric model into the voxelized models 240 in system memory 212.

In some embodiments, a mesh representation may have been previously voxelized into a volumetric model via one or more other voxelization techniques not described herein. In such embodiments, the model filling engine 232, model growing engine 234, and model finishing engine 236 operate on the previously voxelized model rather than on a mesh representation. Upon completion of the filling, growing, and finalization processes described above, the model finishing engine 236 may store the finalized volumetric model into the voxelized models 240 in system memory 212.

Figure 3B:
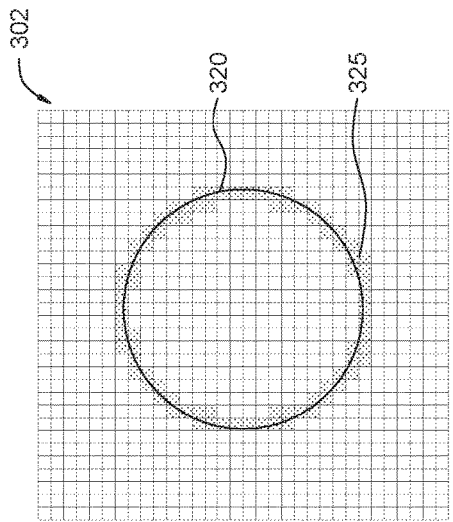
FIGS. 3A-3F illustrate a sequence of cross-sectional views of a voxelization process for a cross section without voids, according to various embodiments of the present invention.
Figure 3D:
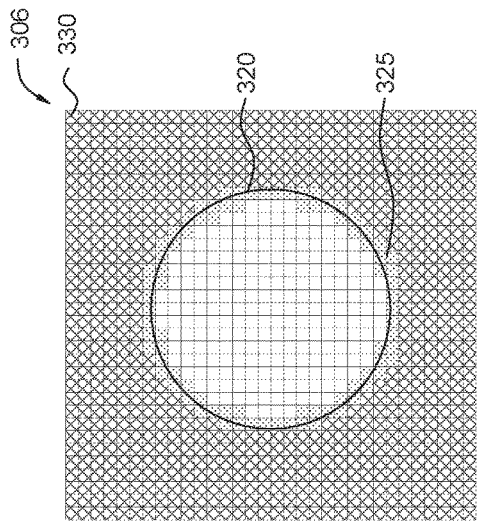
Figure 3A:
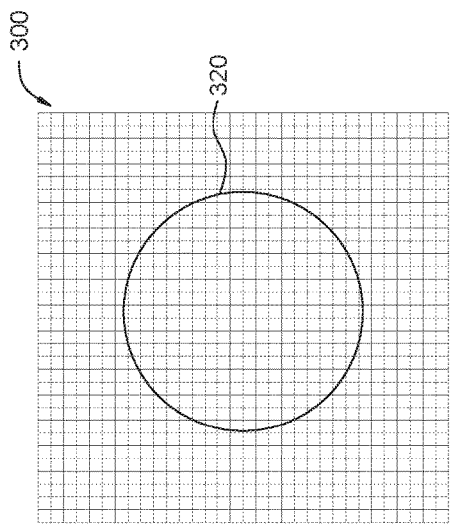
Figure 3C:
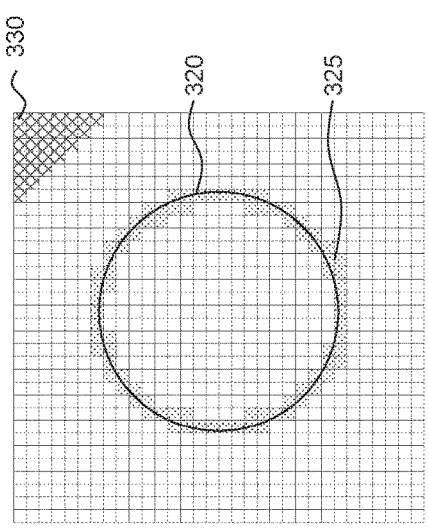
Figure 3F:
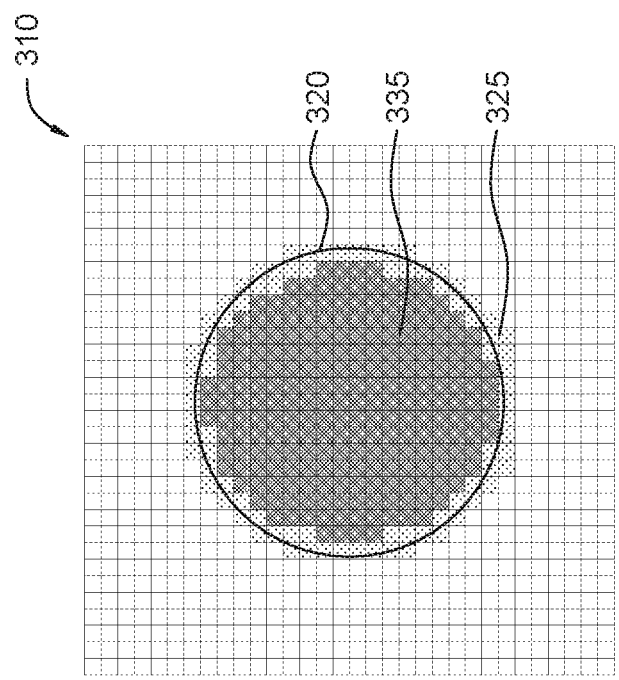
Figure 3E:
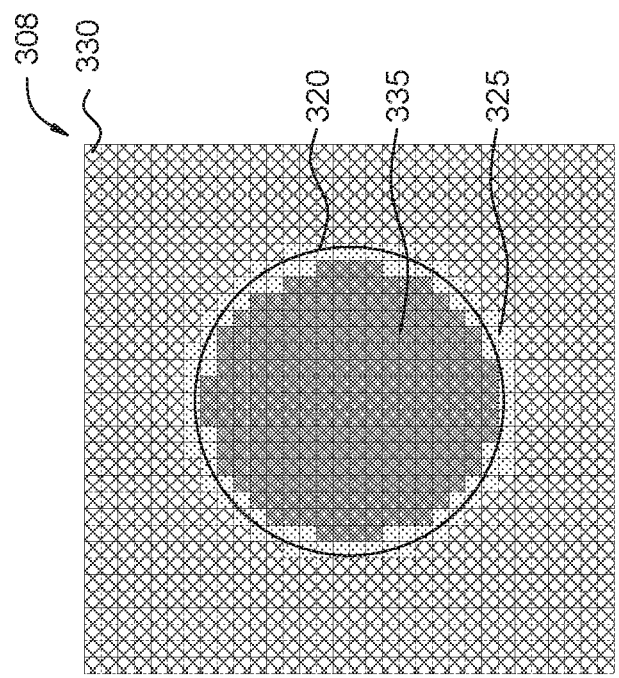

FIGS. 3A-3F illustrate a sequence of cross-sectional views of a voxelization process for a cross section without voids, according to various embodiments of the present invention. As shown in FIG. 3A, a voxel grid array 300 surrounds a cross-section 320 of a mesh representation. FIG. 3B illustrates that voxels in the voxel grid array 302 that intersect with the cross-section 320 are marked as boundary voxels, such as voxel 325. FIG. 3C illustrates the start of a flood fill process, where a voxel 330 on the boundary of the voxel grid array 304 is selected, and neighboring voxels are recursively marked as exterior voxels. In FIG. 3D, all voxels in the voxel grid array 306 that are recursively reachable from voxel 330 are marked as exterior voxels. FIG. 3E illustrates the voxel grid array 308 after all unmarked voxels, such as voxel 335, have been marked as interior voxels. FIG. 3F illustrates the final volumetric model within voxel grid array 310 resulting from the filling process.

Figure 4B:
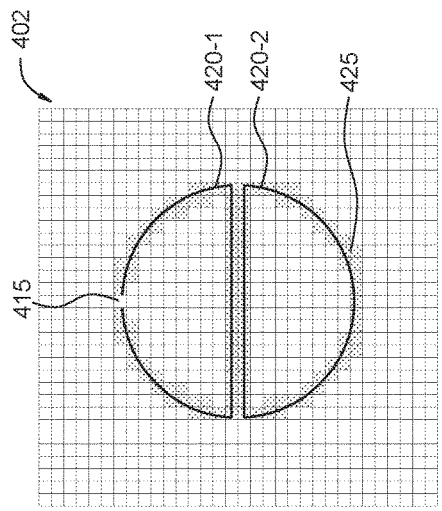
FIGS. 4A-4G illustrate a sequence of cross-sectional views of a voxelization process for a cross section that includes a single void, according to other various embodiments of the present invention.
Figure 4D:
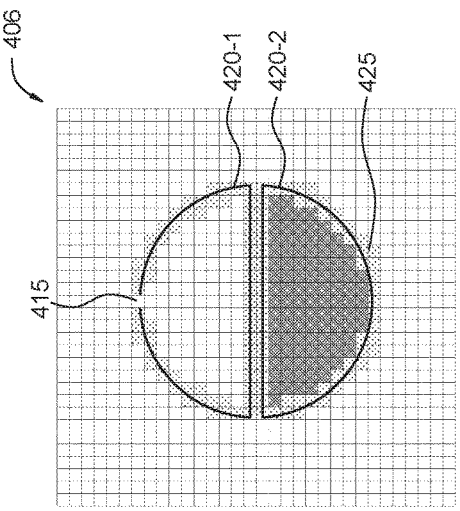
Figure 4A:
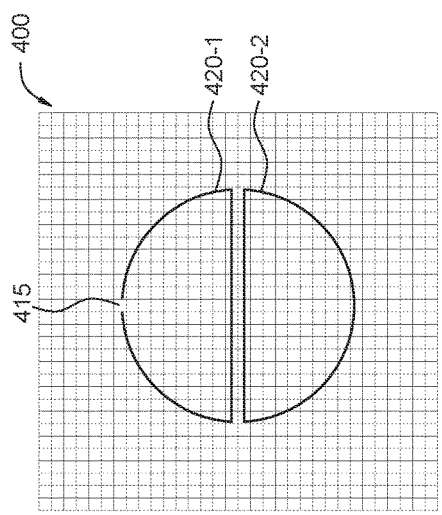
Figure 4C:
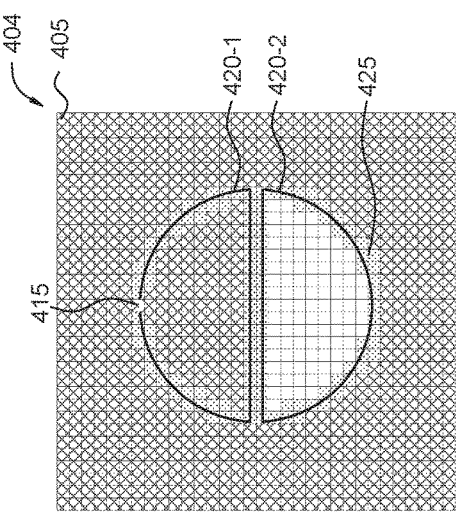

FIGS. 4A-4G illustrate a sequence of cross-sectional views of a voxelization process for a cross section that includes a single void, according to other various embodiments of the present invention. As further described, the cross section undergoes a filling and growing processes in order to fill the void. As shown in FIG. 4A, a voxel grid array 400 surrounds a cross-section of a mesh representation that includes two sections 420-1 and 420-2. Section 420-2 includes an enclosed semicircle, while section 420-1 includes an open semicircle with a void 415 near the top of the voxel grid array 400. FIG. 4B illustrates that voxels in the voxel grid array 402 that intersect with sections 420-1 and 420-2 are marked as boundary voxels, such as voxel 425. FIG. 4C illustrates the result of a flood fill process, where all voxels in the voxel grid array 404 that are recursively reachable from voxel 405 are marked as exterior voxels. Voxels within section 420-2 are not reachable, and, therefore, remain unmarked. However, voxels within section 420-1 are reachable via void 415, and, therefore, are incorrectly marked as exterior voxels. FIG. 4D illustrates the volumetric model within voxel grid array 406 after a first pass of the filling process.

Figure 4E:
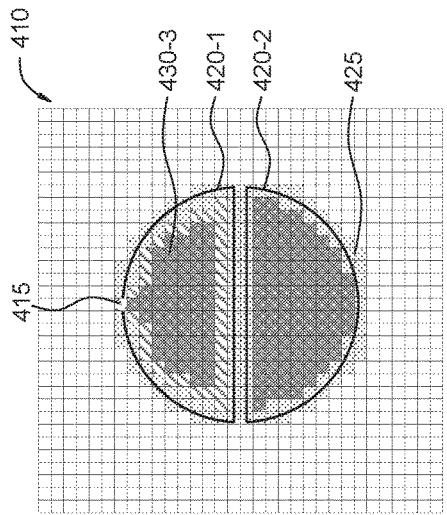
Figure 4F:
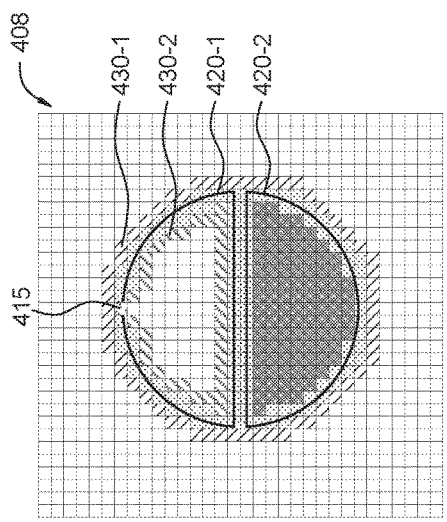
Figure 4G:
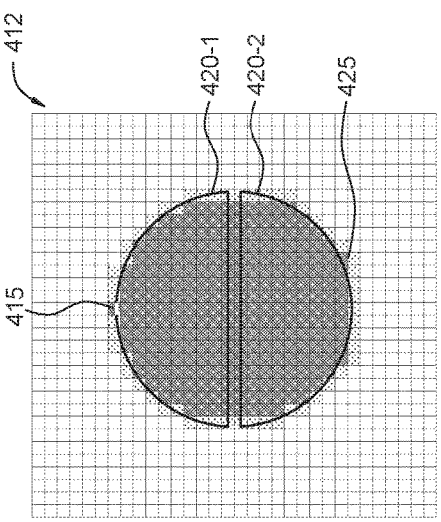

FIG. 4E illustrates the voxel grid array 408 after performing a growing process. As shown, exterior voxels that neighbor at least one boundary voxel or interior voxel are selected as test voxels. Voxels determined to be outside section 420-1, such as voxel 430-1, remain unchanged. Voxels determined to be inside section 420-1, such as voxels 415 and 430-2, are marked as interior voxels. FIG. 4F illustrates voxel grid array 410 after an additional filling process, where voxels within section 420-1, such as voxel 430-3, are marked as interior voxels. FIG. 4G illustrates the final volumetric model within voxel grid array 412 resulting from the voxelization process after finalization. Because voxel 415 is adjacent to at least one exterior voxel, voxel 415 is marked as a final boundary voxel. All other voxels marked during the growing process, such as voxel 430-4, are not adjacent to any exterior voxels, and are, therefore, marked as final interior voxels.

Figure 5B:
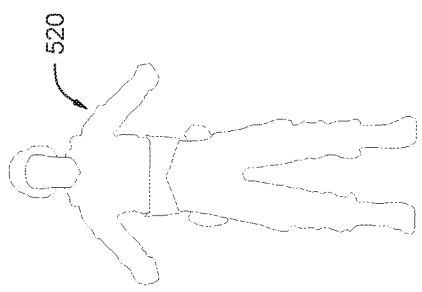
FIGS. 5A-5H illustrate a sequence of volumetric views of a voxelization process for a cross section that includes multiple voids, according to yet other various embodiments of the present invention.
Figure 5D:
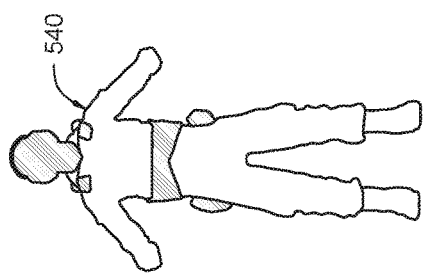
Figure 5A:
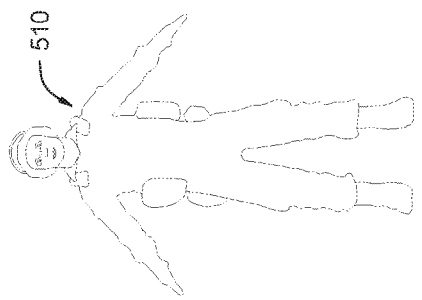
Figure 5C:
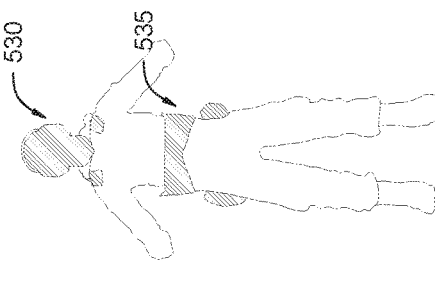
Figure 5F:
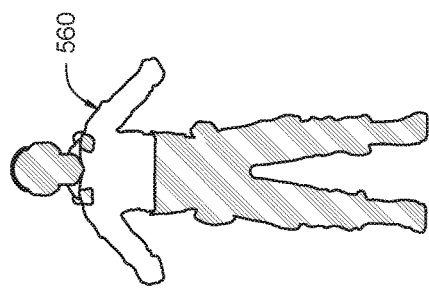
Figure 5H:
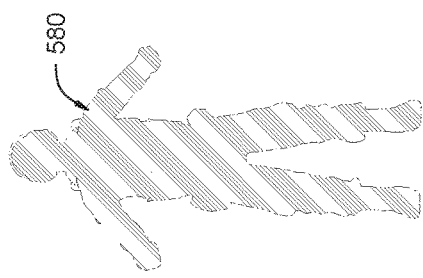
Figure 5E:
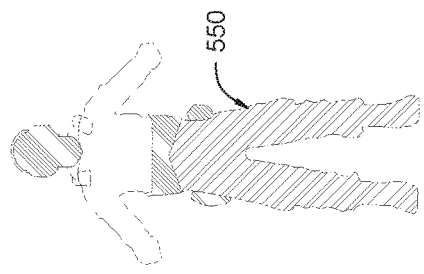
Figure 5G:
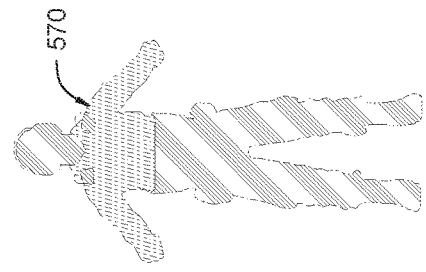

FIGS. 5A-5H illustrate a sequence of volumetric views of a voxelization process for a cross section that includes multiple voids, according to yet other various embodiments of the present invention. As further described, the cross section undergoes multiple filling and growing processes in order to fill the multiple voids. FIG. 5A illustrates a mesh representation 510 that includes multiple voids or other defects (not explicitly shown). FIG. 5B illustrates the boundary 520 of the volumetric model after marking voxels intersecting the mesh representation 510 as boundary voxels. FIG. 5C illustrates the volumetric model after the first filling process, where sections, such as sections 530 and 535, have been filled. FIG. 5D illustrates the boundary 540 of the volumetric model after the first growing process to fill voids in the volumetric model. Figure 5E illustrates the volumetric model after the second filling process, where sections, such as section 550, have been filled. FIG. 5F illustrates the boundary 560 of the volumetric model after the second growing process to fill remaining voids in the volumetric model. FIG. 5G illustrates the volumetric model after the third filling process, where sections, such as section 570, have been filled. FIG. 5H illustrates the final volumetric model 580 resulting from the voxelization process after all filling, growing, and finishing operations have completed.

Figure 6A:
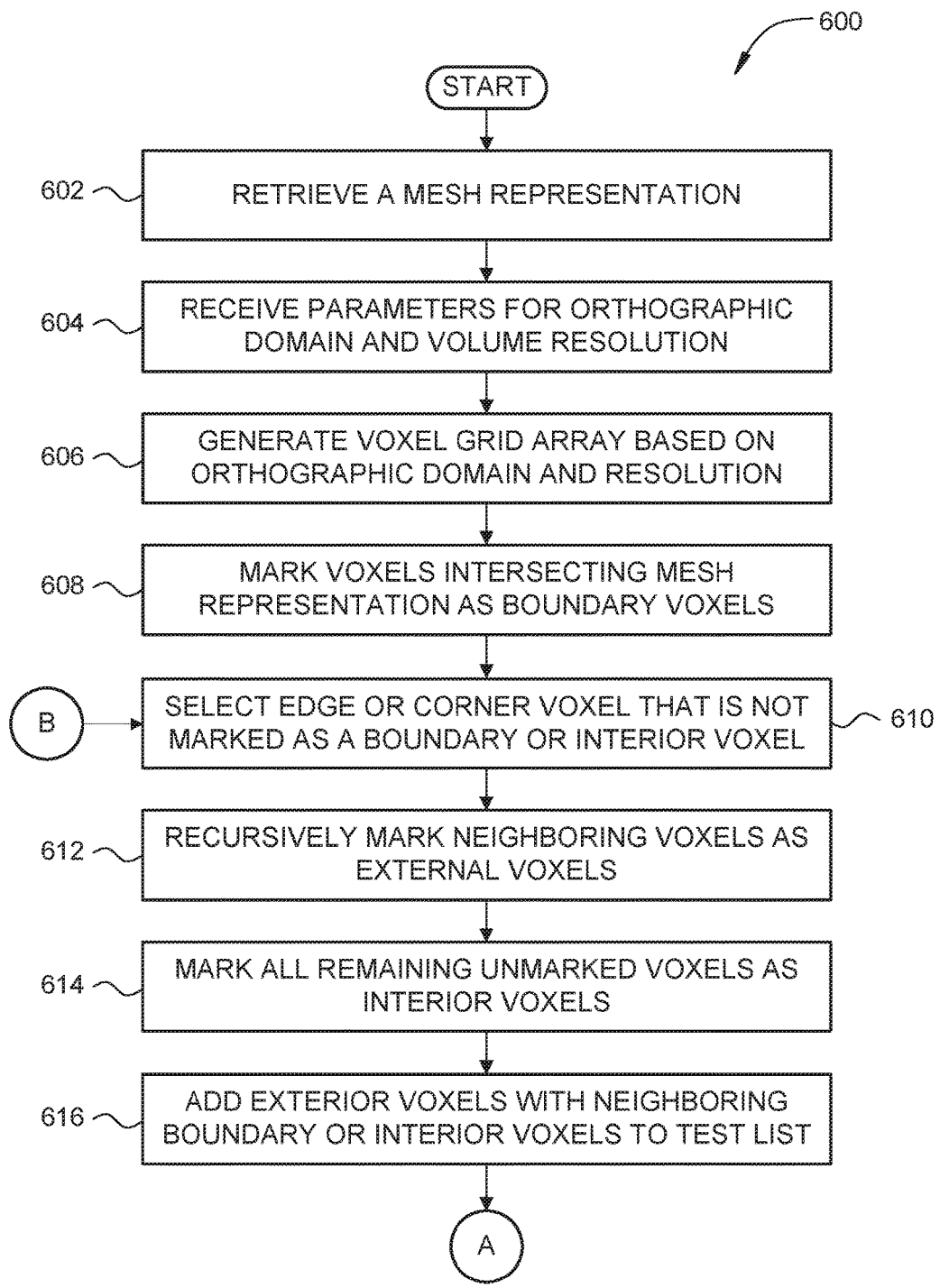
FIGS. 6A-6C set forth a flow diagram of method steps for voxelizing a mesh representation to generate a volumetric model, according to various embodiments of the present invention.
Figure 6B:
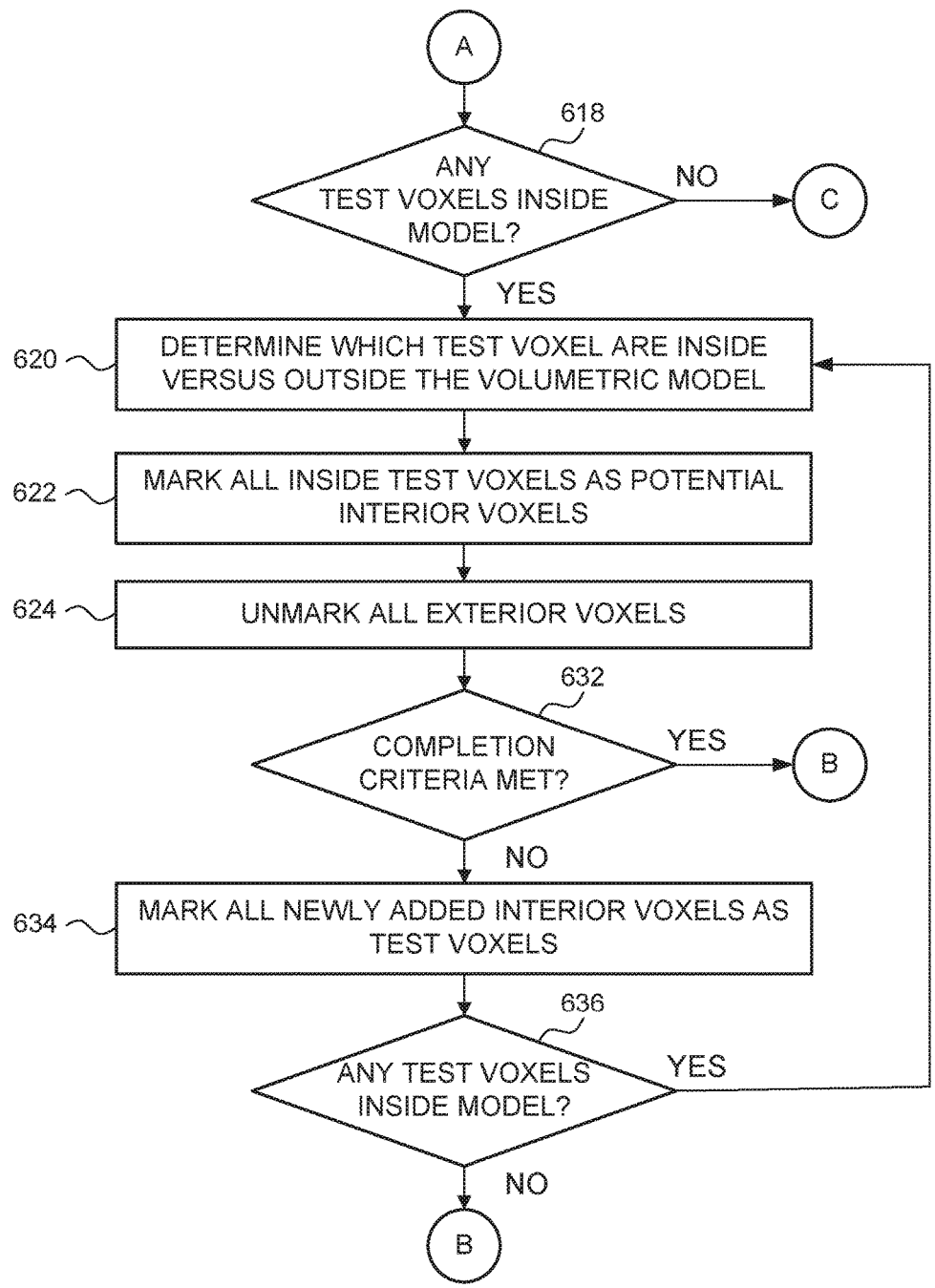
Figure 6C:
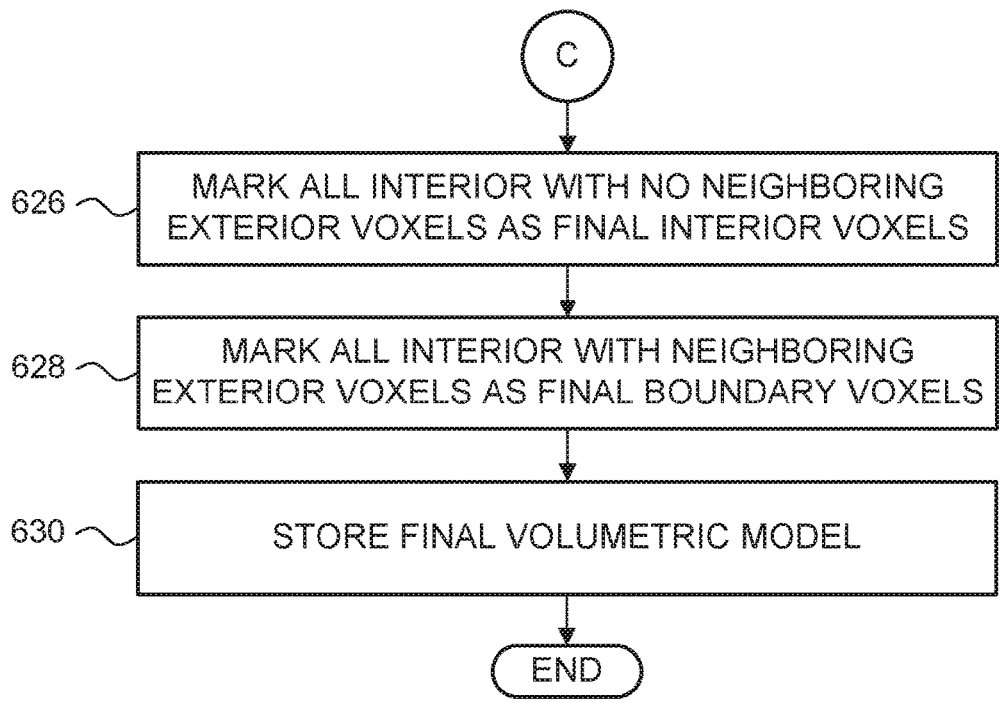

FIGS. 6A-6C set forth a flow diagram of method steps for voxelizing a mesh representation to generate a volumetric model, according to various embodiments of the present invention. Although the method steps are described in conjunction with the systems of FIGS. 1-2, persons of ordinary skill in the art will understand that any system configured to perform the method steps, in any order, is within the scope of the invention.

As shown, a method 600 begins at step 602, where the model filling engine 232 retrieves a mesh representation, as shown in FIGS. 3A, 4A, and 5A. At step 604, the model filling engine 232 receives parameters that define an orthographic domain and a desired volume resolution. At step 606, the model filling engine 232 generates a voxel grid array by dividing the orthographic domain into voxels at the desired volume resolution. At step 608, the model filling engine 232 marks voxels in the voxel grid array that intersect the mesh representation as boundary voxels, as shown in FIGS. 3B, 4B, and 5B. At step 610, the model filling engine 232 selects a voxel at an edge or corner of the voxel grid array that has not been marked as a boundary voxel or interior voxel, as shown in FIG. 3C. At step 612, the model filling engine 232 recursively marks all reachable neighboring voxels of the selected voxel as external voxels, as shown in FIGS. 3D and 4C. At step 614, the model filling engine 232 marks all remaining unmarked voxels as interior voxels, as shown in FIGS. 3E-3F, 4D, and 5C.

At step 616, the model growing engine 234 adds the set of exterior voxels that have at least one neighboring voxel that is a boundary voxel or an interior voxel to a test list, as shown in FIGS. 4E, 5D, and 5F. At step 618, the model growing engine 234 determines whether one or more of the voxels in the test list are inside the volumetric model. In some embodiments, the model growing engine 234 may make this determination by calculating the winding number for each voxel in the test list. If one or more of the voxels in the test list are inside the volumetric model, then the method 600 proceeds to step 620, where the model growing engine 234 determines which of the voxels in the test list are inside the volumetric model and which voxels are outside the volumetric model. Again, in some embodiments, the model growing engine 234 may make this determination by calculating the winding number for each voxel in the test list. In some embodiments, the model growing engine 234 reuses the winding numbers calculated in step 618. At step 622, the model growing engine 234 marks all inside voxels on the test list as interior voxels, as shown in FIGS. 4F, 5E, and 5G. At step 624, the model growing engine 234 unmarks all exterior voxels.

At step 632, the model growing engine 234 determines whether completion criteria for the model growing process have been met. In some embodiments, the model growing engine 234 determines that one or more completion criteria have been met when no new voxels are found to add to the voxel test list. In some embodiments, the model growing engine 234 determines that completion criteria have been met when the steps of the growing process have been repeated a given number of times or that a given number of iterations of the growing process has completed. If the one or more completion criteria have been met, then the method proceeds to step 610, described above. If the one or more completion criteria have not been met, then the method proceeds to step 634, where the model growing engine 234 marks all newly added interior voxels as test voxels and adds the test voxels to the test list.

At step 636, the model growing engine 234 determines whether one or more of the voxels in the test list are inside the volumetric model. In some embodiments, the model growing engine 234 may make this determination by calculating the winding number for each voxel in the test list and may reuse any previously computed winding numbers corresponding to any one or more of the current test voxels. If one or more of the voxels in the test list are inside the volumetric model, then the method 600 proceeds to step 620, described above. If, at step 636, none of the voxels in the test list are inside the volumetric model, then all of the voxels in the test list are outside the volumetric model. In such cases, the method 600 proceeds to step 610, described above.

Returning to step 618, if none of the voxels in the test list are inside the volumetric model, then all of the voxels in the test list are outside the volumetric model. In such cases, the method 600 proceeds to step 626, where the model finishing engine 236 marks all interior voxels that have no neighboring voxel marked as an exterior voxel as a final interior voxel, as shown in FIGS. 4G and 5H. At step 628, the model finishing engine 236 marks all interior voxels that have at least one neighboring voxel marked as an exterior voxel as a final boundary voxel, as shown in FIGS. 4G and 5H. At step 630, the model finishing engine 236 stores the finalized volumetric model. The method 600 then terminates.

In sum, a voxelization system voxelizes a mesh representation into a high quality volumetric model without the need for manual intervention. The voxelization system includes a model filling engine, a model growing engine, and a model finishing engine. The model filling engine retrieves a mesh representation for voxelization, where the mesh representation may include voids or other defects. The model filling engine creates a voxel grid array within an orthographic domain at a specified resolution. The model filling engine voxelization system determines which voxels within the voxel grid array intersect the mesh representation and marks those voxels as boundary voxels. The model filling engine flood fills the voxel grid array, marking all unmarked, reachable voxels as external voxels. The model filling engine then marks all unreachable voxels as interior voxels. The model growing engine determines whether defects in the original mesh representation resulted in one or more voxels inside the model to be marked incorrectly as exterior voxels. The model growing engine grows the boundary of the model by marking such voxels as interior voxels. The model filling engine and the model growing engine then repeat the filling and growing process until no voids remain. The model finishing engine then marks the voxels appropriately and stores the finalized volumetric model.

At least one advantage of the disclosed techniques is that high quality volumetric models are created from imperfect mesh representation with little or no manual intervention. Another advantage of the disclosed techniques is that defects in volumetric models introduced by other voxelization approaches are repaired with little or no manual intervention. As a result, volumetric models may be prepared for animation, manufacturing, or 3D printing at lower cost and in less time relative to prior approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for voxelizing a mesh representation associated with a three-dimensional model to generate a volumetric model, comprising:
    identifying a first voxel included in a voxel grid array that intersects with the mesh representation;
    selecting a second voxel at an exterior boundary of the voxel grid array that is not identified as a boundary voxel;
    marking the second voxel as an exterior voxel;
    marking all unmarked voxels that are adjacent to the second voxel as exterior voxels;
    marking all remaining voxels as interior voxels; and
    generating a volumetric model based at least in part on the first voxel.

2. The method of claim 1, wherein identifying the first voxel comprises:
    dividing an orthographic domain into voxels of a specified width, height, and depth to generate the voxel grid array; and
    marking, as boundary voxels, one or more voxels in the voxel grid array that intersect the mesh representation.

3. The method of claim 2, wherein the mesh representation has at least one surface that includes a void or gap.

4. The method of claim 1, further comprising:
    identifying a second set of voxels included in the voxel grid array, wherein each voxel in the second set of voxels has at least one voxel marked as an external voxel and is adjacent to at least one of a boundary voxel and an interior voxel;
    determining a subset of voxels included in the second set of voxels that reside inside a boundary associated with the volumetric model; and
    marking each voxel in the subset of voxels as a potentially interior voxel.

5. The method of claim 4, wherein determining the subset of voxels included in the second set of voxels comprises computing a winding number for each voxel in the second set of voxels.

6. The method of claim 5, wherein determining the subset of voxels included in the second set of voxels comprises determining which voxels in the subset of voxels have a winding number that is above a given threshold.

7. The method of claim 4, further comprising repeating the steps of identifying a second set of voxels, determining a subset of voxels, and marking each voxel in the subset of voxels as a potentially interior voxel until a completion criterion is met.

8. The method of claim 4, wherein the completion criterion includes determining that no voxel included in the second set of voxels is inside a boundary of the volumetric model.

9. The method of claim 4, further comprising, for each potentially interior voxel:
    determining whether the potentially interior voxel is adjacent to one or more voxels marked as external voxels; and
    if the potentially interior voxel is adjacent to one or more voxels marked as external voxels, then marking the potentially interior voxel as a final boundary voxel; or
    if the potentially interior voxel is not adjacent to one or more voxels marked as external voxels, then marking the potentially interior voxel as a final interior voxel.

10. The method of claim 1, wherein generating a volumetric model is further based at least in part on the at least one voxel marked as an interior voxel.

11. The method of claim 1, further comprising:
    selecting an unmarked neighboring filling voxel that is adjacent to at least one of a neighboring filling voxel identified as an exterior voxel or the second voxel, wherein the unmarked neighboring filling voxel is not identified as an exterior voxel;
    marking the unmarked neighboring filling voxel as an exterior voxel; and
    repeating the steps of selecting an unmarked neighboring filling voxel and marking the unmarked neighboring filling voxel as an exterior voxel until no unmarked neighboring filling voxel are left to be selected.

12. A non-transitory computer-readable storage medium including instructions that, when executed by a processor, cause the processor to voxelize a mesh representation to generate a volumetric model by performing the steps of:
    identifying a first voxel included in a voxel grid array that intersects with the mesh representation;
    selecting a second voxel at an exterior boundary of the voxel grid array that is not identified as a boundary voxel;
    marking the second voxel as an exterior voxel; and
    generating a volumetric model based at least in part on the first voxel.

13. The non-transitory computer-readable storage medium of claim 12, further comprising:
    marking all unmarked voxels that are adjacent to the second voxel as exterior voxels; and
    marking all remaining voxels as interior voxels.

14. The non-transitory computer-readable storage medium of claim 13, wherein identifying the first voxel comprises:
    dividing an orthographic domain into voxels of a specified width, height, and depth to generate the voxel grid array; and
    marking, as boundary voxels, one or more voxels in the voxel grid array that intersect the mesh representation.

15. The non-transitory computer-readable storage medium of claim 14, wherein the mesh representation has at least one surface that includes a void or gap.

16. The non-transitory computer-readable storage medium of claim 13, further comprising:
    identifying a second set of voxels included in the voxel grid array, wherein each voxel in the second set of voxels has at least one voxel marked as an external voxel and is adjacent to at least one of a boundary voxel and an interior voxel;

determining a subset of voxels included in the second set of voxels that reside inside a boundary associated with the volumetric model; and marking each voxel in the subset of voxels as a potentially interior voxel.

17. The non-transitory computer-readable storage medium of claim 16, wherein determining the subset of voxels included in the second set of voxels comprises computing a winding number for each voxel in the second set of voxels.

18. The non-transitory computer-readable storage medium of claim 17, wherein determining the subset of voxels included in the second set of voxels comprises determining which voxels in the subset of voxels have a winding number that is above a given threshold.

19. The non-transitory computer-readable storage medium of claim 16, further comprising repeating the steps of identifying a second set of voxels, determining a subset of voxels, and marking each voxel in the subset of voxels as a potentially interior voxel until a completion criterion is met.

20. The non-transitory computer-readable storage medium of claim 16, wherein the completion criterion includes determining that the steps of identifying a second set of voxels, determining a subset of voxels, and marking each voxel in the subset of voxels as a potentially interior voxel have been repeated a threshold number of times.

21. A system, comprising:

a memory that includes a model filling engine and a model finishing engine; and a processor that is coupled to the memory, wherein, when executing the model filling engine, the processor is configured to:

identify a first voxel included in a voxel grid array that intersects with the mesh representation, select a second voxel at an exterior boundary of the voxel grid array that is not identified as a boundary voxel, and mark the second voxel as an exterior voxel; and wherein, when executing the model finishing engine, the processor is configured to generate a volumetric model based at least in part on the first voxel.

* * * * *